United States Patent [19]

Collins

[11] Patent Number: 4,738,905

[45] Date of Patent: Apr. 19, 1988

[54] MANIFOLD SEAL STRUCTURE FOR FUEL CELL STACK

[75] Inventor: William P. Collins, South Windsor, Conn.

[73] Assignee: International Fuel Cells Corporation, South Windsor, Conn.

[21] Appl. No.: 938,483

[22] Filed: Dec. 3, 1986

[51] Int. Cl.[4] .............................................. H01M 8/24
[52] U.S. Cl. ........................................ 429/36; 429/37; 429/38; 220/378
[58] Field of Search ....................... 429/35, 36, 37, 38, 429/39, 185; 277/215, 235 B, 166, 152; 220/308, 310, 357, 358, 378

[56] References Cited

U.S. PATENT DOCUMENTS

| | | | |
|---|---|---|---|
| 4,212,929 | 7/1980 | Grevstad et al. | 429/185 |
| 4,345,009 | 8/1982 | Fahle et al. | 429/38 |
| 4,374,185 | 2/1983 | Powers et al. | 429/36 |
| 4,588,105 | 5/1986 | Schmitz et al. | 220/308 |
| 4,623,596 | 11/1986 | Kamoshita | 429/39 |

FOREIGN PATENT DOCUMENTS 0214164  4/1984  Japan ...................................... 429/36

*Primary Examiner*—Donald L. Walton
*Attorney, Agent, or Firm*—William W. Jones

[57] ABSTRACT

The seal between the sides of a fuel cell stack and the gas manifolds is improved by adding a mechanical interlock between the adhesive sealing strip and the abutting surface of the manifolds. The adhesive is a material which can flow to some extent when under compression, and the mechanical interlock is formed providing small openings in the portion of the manifold which abuts the adhesive strip. When the manifolds are pressed against the adhesive strips, the latter will flow into and through the manifold openings to form buttons or ribs which mechanically interlock with the manifolds. These buttons or ribs increase the bond between the manifolds and adhesive, which previously relied solely on the adhesive nature of the adhesive.

6 Claims, 1 Drawing Sheet

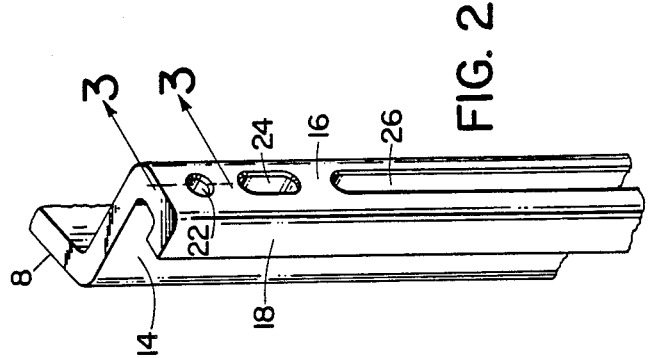
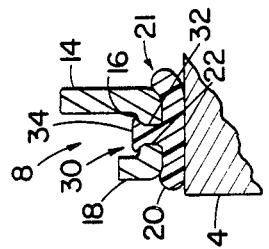
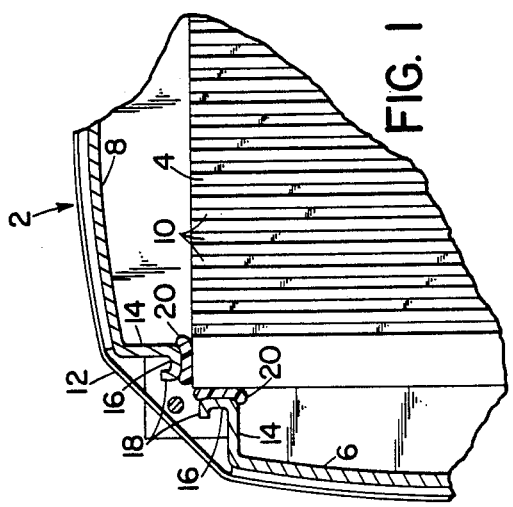
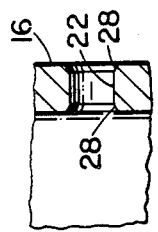

MANIFOLD SEAL STRUCTURE FOR FUEL CELL STACK

This invention was made with Government support under a contract awarded by the Department of Energy. The Government has certain rights in this invention.

TECHNICAL FIELD

This invention relates to an improved seal for use in mounting gas manifolds on fuel cell stacks.

BACKGROUND ART

Fuel cell stacks which utilize gaseous reactants conventionally are provided with opposed pairs of side manifolds which distribute the reactant gases to the cells in the stack, and which gather reactant exhaust gases from the cells in the stack. In the larger commercial stacks, the manifolds may take the form of large shells which abut the sides of the stack and are secured in place by some sort of fastening means. U.S. Pat. No. 4,345,009 granted Aug. 17, 1982, is illustrative of such a commercial stack and manifold construction.

When this type of construction is used, care must be taken to seal the edges of the manifold against the stack so that the reactant gases and the exhaust gases will not escape into the ambient surroundings. This seal has been effected with elastomeric gaskets and also with elastomeric adhesive gaskets. The elastomeric gaskets rely on the compression forces of the mechanism which secures the manifold to the stack for their integrity. The elastomeric adhesive gaskets will provide a more stable seal because they rely on compressive forces plus adhesion to the stack and to the manifold for their integrity.

This invention relates to an improvement in the elastomeric adhesive seal provided by the gaskets. The improved seal will display better stability under pressure excursion conditions in the manifolds, i.e., when changes in manifold pressure occur quickly and with some degree of magnitude due to gas flow rate changes which occur in the system. These flow rate changes can result from intentional changes in operating conditions, such as, power output variations, or they can result from unintentional phenomena, such as, flow passage restriction or blockage, or the like. With the improved seal of this invention, there is formed a mechanical interlock between the sealing gasket and the manifold flange which engages the sealing gasket. The gasket used in this invention is preferably the adhesive eleastomeric gasket of the prior art, so that, as modified, the seal has the compression characteristic, the adhesion characteristic, and also a mechanical interlock characteristic. The mechanical interlock between the sealing gasket and the manifold flange is obtained by forming discreet openings in the manifold flange. These openings may be formed by drilling, milling or the like. The aforesaid openings are formed on the manifold flange which abuts the sealing gasket and is compressed by the pressure of the securement means used to hold the manifolds against the stack. The sealing gaskets are, to a certain extent, inherently flowable when placed under compression, thus, the gasket material will extrude into and flow through the flange openings as a result of the compressive forces imposed upon the gasket by the manifolds. The gaskets will thus form integral rivet-like mechanical interlocks with the manifold at each of the openings. These mechanical interlocks can only be broken if the gasket were forced by pressure to flow back out of the openings, or if the gaskets were torn at the rivet-like connectors. It is thus readily apparent that the seal formed in accordance with this invention will be more resistant to pressure-induced failure.

It is therefore an object of this invention to provide an improved seal between a fuel cell stack and associated gas manifolds mounted on the stack.

It is a further object of this invention to provide a seal of the character described wherein an adhesive sealing gasket is extruded through restricted openings in manifold flanges to form integral rivet-like connections between the gasket and the manifold.

These and other objects and advantages will become more readily apparent from the following detailed description of a preferred embodiment of the invention when taken in conjunction with the accompanying drawings.

BRIEF DESCRIPTION OF DRAWINGS

FIG. 1 is a fragmented horizontal sectional view of a corner of a fuel cell stack employing the sealing structure of this invention;

FIG. 2 is a fragmented perspective view of a gas manifold used with the stack of FIG. 1 showing the sealing flange and several varieties of openings that can be used to effect the seal of this invention;

FIG. 3 is a sectional view taken along line 3—3 of FIG. 2 showing details of the flange openings; and FIG. 4 is a fragmented horizontal sectional view of the seal showing the integral rivet-like connection found between the gasket and manifold flange.

BEST MODE FOR CARRYING OUT THE INVENTION

Referring now to the drawings, there is shown in FIG. 1 a sectional view of a corner of a fuel cell stack formed in accordance with this invention. The stack, denoted generally by the numeral 2, includes the component plates 4 and the gas manifolds 6 and 8. It will be understood that the plates 4 are rectangularly shaped and there are four manifolds in total, one on each side of the stack 2. Certain ones of the plates 4 have grooves 10 which open into the manifolds 8 and through which a gaseous reactant is delivered to the reacting zones of the stack 2. It will be also understood that similar grooves open into the manifold 6 from other of the plates 4 to deliver the other gaseous reactants to the reacting zones of the stack 2. The manifolds 6 and 8 may be pressed against the stack 2 as for example, by bands 12 which encircle the manifolds 6 and 8 and the stack 2. Alternatively, tie rods could be used. Each manifold has side walls 14 which merge into outwardly extending sealing flanges 16 having upturned free ends 18. Sandwiched bewteen the flanges 16 and the plates 14 are gasket strips 20. The gasket strips are formed from Gore-Tex®, a PTFE material which possesses some flow capabilities under pressure, and which is coated with a fluorocarbon polymer adhesive for this application. Gore-Tex® is a trademark for a flowable polytetrafluoroethylene material having a fibrous texture which is manufactured by W. L. Gore and Associates, Inc., Elkton, Md. This material is described in U.S. Pat. Nos. 3,953,566 and 4,187,390. It will be understood that the strips 12 force the manifolds 6 and 8 toward the plates 4 so that the gasket strips 20 are compressed between the plates 4 and the manifold sealing flanges 16.

It will be noted from FIG. 2 that the manifold sealing flanges 16 have openings therein midway between the edges of the sealing flanges 16. The openings may take several different shapes, as, for example, they may be circular as at 22, or they may be relatively short elongated slots, as at 24, or even longer slots 26. The preferred shape of the sealing flange openings is circular. It will be noted in FIG. 3 that the sealing flange openings 22 are formed with chamfers 28 on their inside and outside ends.

Referring to FIG. 4, the interlock between the sealing gasket 20 and the sealing flange 16 is shown. When the manifold is pressed against the sides of the stack, the sealing flange 16 is forced against the gasket 20. The portions of the gasket 20 adjacent the openings 22 will be forced through the openings 22 to form integral rivet-like interlocks with the sealing flange 16. The interlocks 30 will each include a reduced neck portion 32 which merges into the main body of the gasket 20, and an expanded head portion 34 which flows outwardly somewhat from the openings 22 to overlie the surface of the sealing flange 16 remote from the gasket 20. The chamfers 28 on the openings 22, 24 and 26 will impart a radius to the corners of the interlock neck 32 to increase strength and reduce the likelihood of corner fracture.

It will be appreciated that many pressure variations which occur within the manifolds will impinge the gasket 20 at 21 whereby the gaskets 20 could shift laterally. The interlocks 30 between the gasket 20 and the manifold 8 provide added stability to the gasket-manifold combination and resist lateral movement of the gasket with respect to the manifold. It will be appreciated that the interlock between gasket and manifold is simple to produce and requires very little alteration of existing systems, whereby the latter can readily be retrofitted to enjoy the benefits of the invention.

Since many changes and variations of the disclosed embodiments of the invention may be made without departing from the inventive concept, it is not intended to limit the invention otherwise than as required by the appended claims.

I claim:

1. An electrochemical cell stack assembly comprising:
   (a) a stack of electrochemical cells adapted to use gaseous reactants in an electrochemical reaction, said stack having side walls through which the gaseous reactants are admitted to the cells;
   (b) a plurality of gas manifolds mounted on said stack adjacent said side walls, each of said manifolds having edge sealing flanges thereon;
   (c) a plurality of sealing gaskets sandwiched between said manifold edge sealing flanges and said stack side wall to seal the manifold interior from ambient surroundings;
   (d) each of said manifold edge sealing flanges having a plurality of openings formed therein; and
   (e) means for pressing said manifold edge sealing flanges against said sealing gaskets sufficiently to cause localized portions of said gaskets to extrude into said manifold sealing flange openings to form protruding interlocks between said gaskets and said sealing flanges which resist lateral movement of said manifolds relative to said gaskets.

2. The stack assembly of claim 1 wherein said protruding interlocks include reduced diameter neck portions disposed within the confines of said openings, and expanded head portions which overlie portions of said flanges remote from said gaskets and surrounding said openings.

3. The stack assembly of claim 2 wherein said openings include chamfered edges which produce radiused corners on said neck portions of said protruding interlocks.

4. The stack assembly of claim 3 wherein said openings are round.

5. The stack assembly of calim 3 wherein said openings are elongated slots.

6. The stack assembly of claim 1 wherein said gaskets are formed from adhesive-coated PTFE.

* * * * *